United States Patent
Wang et al.

(10) Patent No.: US 9,921,361 B2
(45) Date of Patent: Mar. 20, 2018

(54) DISPLAY SCREEN FRAME ELIMINATING APPARATUS AND DISPLAY DEVICE

(71) Applicant: Boe Technology Group Co., Ltd., Beijing (CN)

(72) Inventors: Shang Wang, Beijing (CN); Heecheol Kim, Beijing (CN); Wei Qin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 201 days.

(21) Appl. No.: 14/499,634

(22) Filed: Sep. 29, 2014

(65) Prior Publication Data
US 2015/0362657 A1    Dec. 17, 2015

(30) Foreign Application Priority Data

Jun. 13, 2014  (CN) .......................... 2014 1 0265445

(51) Int. Cl.
*G09G 3/34* (2006.01)
*F21V 8/00* (2006.01)
(Continued)

(52) U.S. Cl.
CPC ......... *G02B 6/0045* (2013.01); *G02B 6/0055* (2013.01); *G02B 6/0073* (2013.01);
(Continued)

(58) Field of Classification Search
CPC ....................................................... G09G 3/34
See application file for complete search history.

(56) References Cited

U.S. PATENT DOCUMENTS 5,165,080 A * 11/1992 Healey ................. G02B 6/2817
                                                         359/636
8,572,893 B2 * 11/2013 Watanabe ............ G02B 5/0215
                                                          349/73
(Continued)

FOREIGN PATENT DOCUMENTS

CN     102708761     10/2012
CN     103065551     4/2013
(Continued)

OTHER PUBLICATIONS

Office action from Chinese Application No. 201410265445.2 dated Mar. 14, 2016.
(Continued)

*Primary Examiner* — Jonathan Boyd
*Assistant Examiner* — Carl Adams
(74) *Attorney, Agent, or Firm* — Calfee, Halter & Griswold LLP (57) ABSTRACT

The disclosure relates to the field of liquid crystal display, specifically to a display screen frame eliminating apparatus and a display device. The display screen frame eliminating apparatus comprises a light source, a light tube and a drive module. The light tube comprises an upper surface and a lower surface, and the light source is located within the light tube or under the lower surface of the light tube. The light tube enables the light emitted by the light source to dispersedly exit from the upper surface. The drive module drives the light source to emit light based on the luminous condition of the edge pixels of the display area in the display screen. In this way, the light source emits light rays similar as the edge pixels of the display area in the display screen, and the light rays dispersedly exit from the upper surface of the light tube by means of the layered light tube structure. Therefore, to the human eyes, the display influence of the frame can be eliminated in all directions, and the display effect of the display device can be improved.

19 Claims, 5 Drawing Sheets

(51) Int. Cl.
*G02F 1/1333* (2006.01)
*G09G 3/3258* (2016.01)
*G09G 3/3225* (2016.01)
*G02F 1/1335* (2006.01)

(52) U.S. Cl.
CPC ....... *G02F 1/13336* (2013.01); *G09G 3/3225* (2013.01); *G09G 3/3258* (2013.01); *G02F 1/133524* (2013.01); *G02F 2001/133562* (2013.01); *G09G 2300/0809* (2013.01); *G09G 2310/0232* (2013.01); *G09G 2320/029* (2013.01); *G09G 2320/0233* (2013.01); *G09G 2320/0626* (2013.01); *G09G 2360/147* (2013.01)

(56) References Cited

U.S. PATENT DOCUMENTS

| | | | | |
|---|---|---|---|---|
| 2004/0051944 A1* | 3/2004 | Stark | ................ | G02F 1/13336 359/448 |
| 2004/0174694 A1* | 9/2004 | Huang | ............... | H04N 1/02815 362/621 |
| 2006/0193130 A1* | 8/2006 | Ishibashi | ................. | F21V 29/67 362/227 |
| 2010/0238090 A1 | 9/2010 | Pomerantz et al. | | |
| 2011/0242686 A1* | 10/2011 | Watanabe | .......... | G02B 17/0884 359/804 |
| 2013/0176352 A1* | 7/2013 | Watanabe | ................ | G09G 3/34 345/690 |
| 2014/0204067 A1* | 7/2014 | Gupta | ................ | G09G 3/3233 345/211 |

FOREIGN PATENT DOCUMENTS

CN 103412424 11/2013
TW 584758 4/2004

OTHER PUBLICATIONS

Office action from Chinese Application No. 201410265445.2 dated Aug. 10, 2016.
Office action from Chinese Application No. 20140265445.2 dated Aug. 10, 2016.

\* cited by examiner

DISPLAY SCREEN FRAME ELIMINATING APPARATUS AND DISPLAY DEVICE

RELATED APPLICATIONS

The present application claims the benefit of Chinese Patent Application No. 201410265445.2, filed Jun. 13, 2014, the entire disclosure of which is incorporated herein by reference.

FIELD OF THE INVENTION

The present disclosure relates to the field of liquid crystal display, specifically relates to a display screen frame eliminating apparatus and a display device.

BACKGROUND ART

The Liquid Crystal Display (LCD) is a flat, ultrathin display device, which consists of certain amount of colored or black and white pixels and is placed in front of a light source or a reflective plane. It is widely applied in various electronic devices that use batteries for the advantage of low power consumption.

However, the existing liquid crystal display screen usually has frames inevitably, which may influence the display of edge pixels to a certain extent. Especially in a display device with spliced screens, the shelter of the frame may render the whole image to look like having dark lines, which influence the whole display effect of the display device.

SUMMARY

In order to overcome the defects mentioned above as well as other defects, some embodiments described herein provide a display screen frame eliminating apparatus and a display device, which use an internal light source, under the control of a drive module, to emit light rays similar as those of the edge pixels of the display area in the display screen. By means of a layered light tube structure with an upper surface and a lower surface, the light rays dispersedly exit from the upper surface of the light tube. Therefore, to the human eyes, the display influence of the frame can be eliminated in every direction, and the display effect of the display device can be improved.

In order to achieve the above objects as well as other objects, some embodiments described herein provide a display screen frame eliminating apparatus which can comprise a light source, a light tube and a drive module. The light tube can comprise an upper surface and a lower surface, and the light source can be located within the light tube or under the lower surface of the light tube. The upper surface and the lower surface of the light tube can both cover the display screen frame and a non-display edge area of the display screen, and the light tube can be configured to enable light emitted by the light source to dispersedly exit from the upper surface of the light tube. The drive module can be configured to drive the light source to emit light based on luminous condition of edge pixels of a display area in the display screen.

In an embodiment, the light tube can comprise at least one transflective film, the surface of which is a curved surface, connected between the upper surface and the lower surface of the light tube. The light source can be located above the display screen frame, thereby from the view of the normal longitudinal sections of the display screen and the display screen frame, the transflective film appears as an upwardly convex curve above the light source. The light emitted by the light source which is partially reflected by the transflective film can be propagated along a direction parallel to the display screen surface.

In an embodiment, the lower surface of the light tube can comprise a first horizontal plane, a first vertical plane, a first inclined plane and a second horizontal plane connected successively from top to bottom. A reflective layer can be formed on the first inclined plane. The upper surface of the light tube can comprise a third horizontal plane, a second inclined plane, a second vertical plane, a fourth horizontal plane and a third vertical plane connected successively from top to bottom. The second inclined plane can be at least partly formed by a transflective layer.

In an embodiment, the lower surface of the light tube can comprise a first horizontal plane, a first vertical plane and a second horizontal plane connected successively from top to bottom. A reflective layer can be formed on the second horizontal plane. The upper surface of the light tube can comprise a third horizontal plane and a first inclined plane connected successively from top to bottom. The first inclined plane can be at least partly formed by a transflective layer.

In an embodiment, the lower surface of the light tube can comprise a first horizontal plane, a first vertical plane and a second horizontal plane connected successively from top to bottom. A reflective layer can be formed on the second horizontal plane. The upper surface of the light tube can comprise a third horizontal plane and a first cambered surface connected successively from top to bottom. The first cambered surface can be at least partly formed by a transflective layer.

In an embodiment, from the view of the normal longitudinal sections of the display screen and the display screen frame: the lower surface of the light tube can comprise a first horizontal plane and a first cambered surface connected successively from top to bottom. The upper surface of the light tube can comprise a second horizontal plane and a second cambered surface connected successively from top to bottom In an embodiment, the lower surface of the light tube can comprise a first horizontal plane, a first vertical plane and a second horizontal plane connected successively from top to bottom. A reflective layer can be formed on the second horizontal plane. The upper surface of the light tube can comprise a third horizontal plane and a first cambered surface connected successively from top to bottom. The first cambered surface can be at least partly formed by a transflective layer. The light source can be located within the light tube or on the second horizontal plane of the lower surface of the light tube.

In an embodiment, the light tube can be fixed on the display screen frame through a thermal conductive adhesive layer located between the first horizontal plane and the display screen frame.

In an embodiment, the light source can comprise at least one light emitting diode or at least one organic light emitting diode.

In an embodiment, the drive module can comprise a display signal receiving unit, a signal processing unit, a lighting control unit, a data write unit and a write control unit. The display signal receiving unit can be configured to receive and store a display signal of the display screen, and to send the display signal to the signal processing unit. The signal processing unit can be configured to extract edge pixel data of the display area from the received display signal, and to transmit it to the lighting control unit. The lighting control unit can be configured to generate a data write signal and a write control signal for controlling the light source to emit light based on the received edge pixel data, and to transmit them to the data write unit and the write control unit respectively. The data write unit and the write control unit can be configured to enable, under the control of the write control signal, each of the light emitting units in the light source to emit light successively under the control of the data write signal.

In an embodiment, the light source can comprise at least one drive circuit, each of which comprises a light emitting element, a first switch element, a second switch element and a capacitance. A control end of the first switch element can be connected with the write control unit, a first end of the first switch element can be connected with the lighting control unit; a second end of the first switch element can be connected with a control end of the second switch element and a second end of the capacitance; an input end of the light emitting element can be connected with a second end of the second switch element, the light emitting element can emit light based on a voltage inputted by the input end; a first end of the capacitance and a first end of the second switch element can be coupled to a high level work voltage.

In an embodiment, the first switch element and the second switch element can be thin film transistors.

In an embodiment, the signal processing unit can be a timing controller. The lighting control unit can be a source driver. The write control unit can be a gate driver.

Some embodiments described herein further provide a display device comprising a display screen frame eliminating apparatus according to any one of the above embodiments.

In an embodiment, the display device comprises at least two display panels spliced together, and the display screen frame eliminating apparatus can be located on the frame at a splicing seam between the display panels.

Some embodiments described herein at least have the following beneficial effects:

The display screen frame eliminating apparatus proposed in some embodiments described herein can firstly enable the light source, under the drive of the drive module, to emit similar light rays based on the luminous condition of the edge pixels of the display area in the display screen. In addition, a layered light tube comprising an upper surface and a lower surface encloses the light source within the light tube or arranges the light source under the lower surface of the layered light tube, for enabling the light emitted by the light source to dispersedly exit from the upper surface of the light tube. Thereby, when the upper surface and the lower surface of the light tube both cover the display screen frame and the non-display edge area of the display screen, i.e., when the light tube covers above the frame, the light rays can be enabled to dispersedly exit from the frame or the non-display edge area of the display screen into all directions. Finally, if the same structure exists on the normal longitudinal sections (i.e., the longitudinal section at the position of the frame when the display screen is horizontally placed) of each display screen and display screen frame, i.e., when the light tube covers above the whole display screen frame, luminous light rays that are similar as those of the edge pixels of the display area in the display screen can be seen from each perspective externally at the position of the frame or the non-display edge area. Therefore, some embodiments described herein can eliminate the display influence of the frame and improve the display effect of the display device.

Certainly, the embodiments described herein do not necessarily achieve all the advantages stated above simultaneously.

BRIEF DESCRIPTION OF DRAWINGS

In order to illustrate the technical solutions of some embodiments described herein more clearly, these embodiments will be described with reference to the drawings below. Obviously, the drawings described below relate to some embodiments of the present invention, but the ordinary skilled person in the art can also obtain other drawings based on these drawings without any creative work.

DETAILED DESCRIPTION OF EMBODIMENTS

In order to make the objects, technical solutions and advantages of some embodiments described herein clearer, the technical solutions of these embodiments will be described clearly and completely with reference to the drawings below. Apparently, the described embodiments are only part of the embodiments of the present invention, rather than all the embodiments. Based on the embodiments described herein, the ordinary skilled person in the art can obtain other embodiments without any creative work, and all these embodiments belong to the claimed protection scope of the present invention.

Figure 1A:
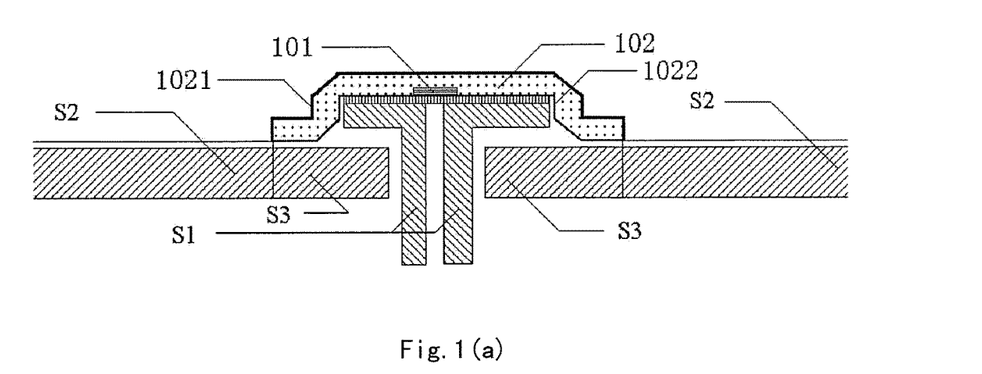
FIG. 1(a) is a schematic structure diagram of a display screen frame eliminating apparatus (double-frame) in an embodiment of the present invention.

An embodiment of the present invention provides a display screen frame eliminating apparatus, referring to FIG.

1(a), which can comprise a light source 101, a light tube 102 and a drive module (connected with the light source 101, not shown in the figure).

The light tube 102 can comprise two surfaces (an upper surface 1021 and a lower surface 1022). The light source 101 can be located within the light tube 102. It is shown in the figure that the light source 101 is located on the lower surface 1022 within the light tube 102, however, in practice, it can also be located at other positions within the light tube 102, or under the lower surface 1022 of the light tube 102. The upper surface 1021 and the lower surface 1022 of the light tube 102 both cover the display screen frame S1 (which mainly refers to the area where the frame locates, i.e., the non-luminous part in the prior art) and the non-display edge area S3 of a display screen S2. The light tube 102 can be configured to enable the light emitted by the light source 101 to dispersedly exit from the upper surface 1021 of the light tube 102.

The drive module can be configured to drive the light source 101 to emit light based on luminous condition of edge pixels of a display area in the display screen S2.

The normal longitudinal sections (i.e., the plane where FIG. 1(a) locates) of the display screen S2 and the display screen frame S1 are respective sections from the viewpoint of the front when the display screen is placed flatwise on the table, wherein the sections are normal sections of the display screen and the frame, meanwhile, they are also the longitudinal sections of the display screen and the frame in such a placement state. Here, the display screen frame eliminating apparatus can have the same repetitive structure on a plurality of normal longitudinal sections.

As shown in the figure, the light tube 102 can be a layered structure with an upper surface and a lower surface, moreover, the upper surface 1021 and the lower surface 1022 both need to be able to cover the display screen frame S1 and the non-display edge area S3 of the display screen S2. Certainly, the shapes of the upper surface 1021 and the lower surface 1022 as shown in FIG. 1(a) are only examples, and the light tube can be designed to have various shapes of the upper surface 1021 and the lower surface 1022 based on the function of "enabling the light emitted by the light source 101 to dispersedly exit from the upper surface 1021 of the light tube 102". In addition, the concepts of upper and lower here mainly mean that the display screen S2 and the frame S1 are located under the display screen frame eliminating apparatus, whereas the location where the luminous condition can be observed is above the display screen S2 and the display screen frame eliminating apparatus.

When the display screen S2 is in a luminous state, the drive module will drive the light source 101 to emit similar light based on the luminous condition of edge pixels of the display area on the display panel adjacent to the display screen frame eliminating apparatus. When the light tube 102 enables these light to dispersedly exit from its upper surface 1021, the light rays exiting from the position of the frame S1 or the position of the non-display edge area S3 can be received externally from every direction, thereby eliminating the frame in visual effect.

Figure 1B:
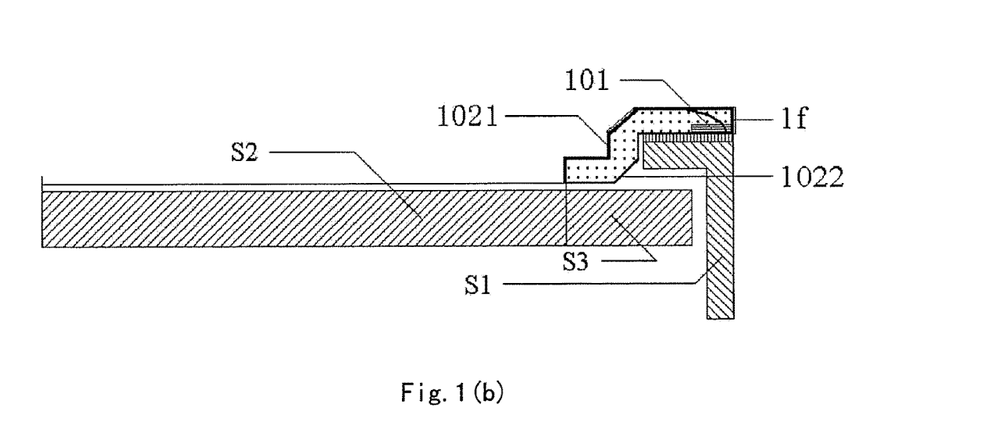
FIG. 1(b) is a schematic structure diagram of a display screen frame eliminating apparatus (single-frame) in an embodiment of the present invention.

It needs to explain that the display screen frame eliminating apparatus as shown in FIG. 1(a) is mounted at a splicing seam of two adjacent display screens S2, i.e., it is applied in a double-frame situation, so it has a bilateral symmetrical structure. The single-side display screen frame eliminating apparatus as shown in FIG. 1(b) also has the similar structure and composition, while in the figure, it is only half of the bilateral symmetrical structure, moreover, a corresponding encapsulation shape (as shown in FIG. 1(b)) that differs from FIG. 1(a) can be arranged at the outer edge of the display screen frame eliminating apparatus, which can correspond to the shape of the display screen frame. That is to say, the display screen frame eliminating apparatus stated in the embodiments described herein can be applied in both the single frame elimination scenario (elimination of a single display screen frame) and double frame elimination scenario (elimination of frame at the splicing seam of the spliced display screens). The display screen frame eliminating apparatus can realize mutual transformation of the single frame and the double frame mainly by means of axis symmetry operation and axis-symmetry-removing operation in structure and possibly assisted by simple edge-removing processing or edge processing.

Figure 2:
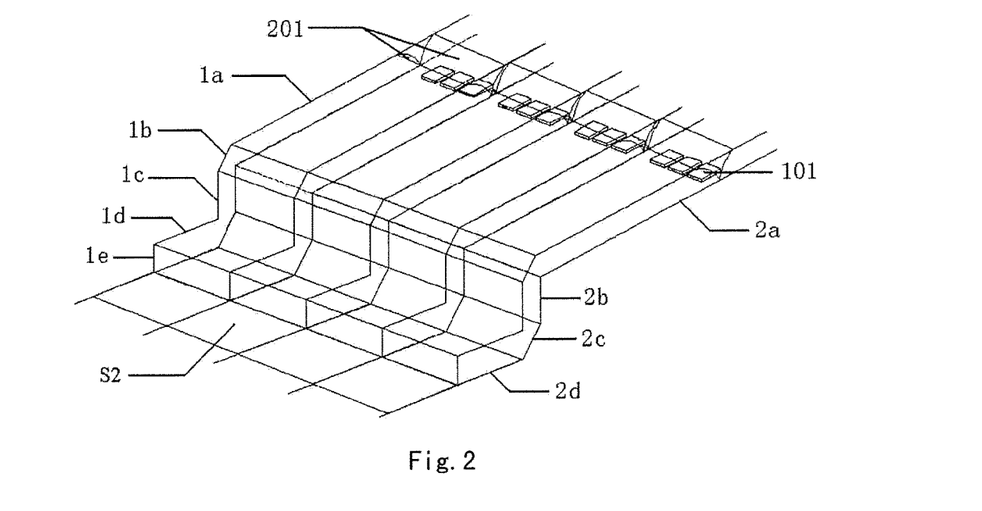
FIG. 2 is a spatial structure diagram of a display screen frame eliminating apparatus with a "square-wave-shaped" light tube in an embodiment of the present invention.

Examples regarding the repetitive structure of the display screen frame eliminating apparatus can be seen from FIG. 2. As shown in the figure, pixels corresponding to different rows or different columns (such as a three-color pixel structure of RGB) of the display screen S2 all have a corresponding display screen frame eliminating apparatus as above. Accordingly, the light source 101 of the display screen frame eliminating apparatus also comprises three single color light sources of red, green, and blue correspondingly, thereby the light source 101 of the display screen frame eliminating apparatus will be able to emit light similar as the edge pixels of the display area only by acquiring the RGB values of the edge pixels of the display area in the display screen S2 and inputting them into the three single color light sources of the light source 101.

In an embodiment, a transflective film 201 can be arranged above the light source 101. The surface of the transflective film 201 can be a curved surface, connected between the upper surface 1021 and the lower surface 1022 of the light tube 102. The light source 101 can be located above the display screen frame S1. As shown in the figure, from the view of the normal longitudinal sections of the display screen and the display screen frame, the transflective film 201 appears as an upwardly convex curve above the light source 101. The light emitted by the light source 101 which is partially reflected by the transflective film 201 can be propagated along a direction parallel to the surface of the display screen S2 (which can be achieved by designing the angles at respective places of the curved surface in combination with the sizes of the light source 101 and the light tube 102 and based on the reflection law of light). Such a structure can enable the light emitted from the light source 101 to be propagated separately according to the exit angles, which is favorable for uniform dispersed exit of the overall light tube 102.

Figure 3:
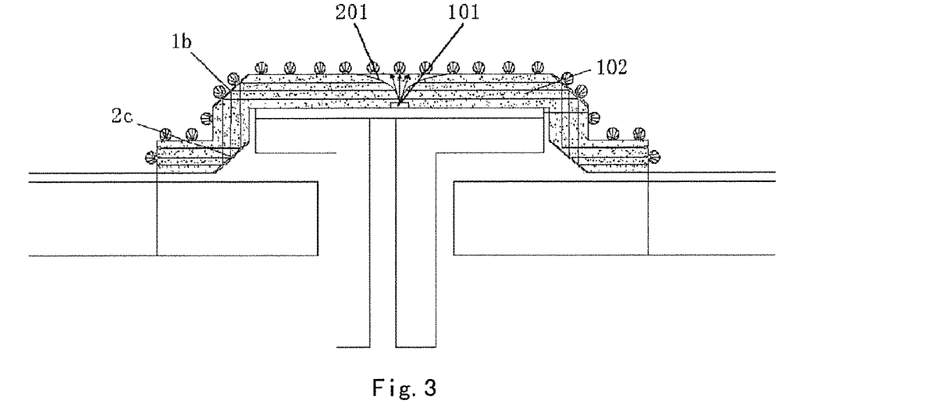
FIG. 3 is a light path view inside a light tube of a display screen frame eliminating apparatus with a "square-wave-shaped" light tube in an embodiment of the present invention.

In combination with a specific example of the shapes of the upper surface 1021 and the lower surface 1022 of the light tube 102, FIG. 3 exemplarily shows a schematic diagram of a light path within the light tube 102 comprising a transflective film 201.

Referring to FIG. 2 and FIG. 3, the lower surface 1022 of the light tube 102 can comprise a first horizontal plane 2a, a first vertical plane 2b, a first inclined plane 2c and a second horizontal plane 2d connected successively from top to bottom. A reflective layer can be formed on the first inclined plane 2c. The upper surface 1021 of the light tube 102 can comprise a third horizontal plane 1a, a second inclined plane 1b, a second vertical plane 1c, a fourth horizontal plane 1d and a third vertical plane 1e connected successively from top to bottom. The second inclined plane 1b can be at least partly formed by a transflective layer.

Under the above exemplary structure, the light rays emitted from respective angles of the light source 101 can experience the following processes respectively.

Assuming the angle at which the light rays are emitted perpendicularly from the light source 101 as 0 degree, and the angle at which the light rays are emitted from the side of the light source 101 as +90 degree or −90 degree, a part of light with a relatively small absolute value of emission angle (according to an example, the emission angle can be in a range of −20 degree to +20 degree) will not be irradiated onto the transflective film 201, as this part of light rays will exit from the third horizontal plane 1a of the upper surface 1021 of the light tube 102 directly and reach the outside after being scattered. Therefore, to the human eyes, it is namely the light emitted from the vicinity of the light source 101 or from the gap of the display screen frame S1.

A part of light rays with a moderate absolute value of emission angle (according to an example, the emission angle can be in ranges of about −60 degree to −20 degree and 20 degree to 60 degree) will be irradiated onto the transflective film 201, and then be partially transmitted and partially reflected. The transmitted part will also exit from the third horizontal plane 1a of the upper surface 1021 of the light tube 102, and reach the outside after being scattered. However, the exit position thereof is further away from the light source, and the oblique angle of emission is larger. Therefore, to the human eyes, it is namely the light emitted from a circle surrounding the light source 101 or around the gap of the display screen frame S1, and the luminance is relatively large when being viewed obliquely.

In addition, the reflected part reflected by the transflective film 201, due to the curve design of the transflective film 201, will be propagated along a direction parallel to the surface of the display screen S2 after the reflection, and partly transmitted and partly reflected at the transflective layer arranged at the second inclined plane 1b, and the reflected light rays will be propagated along a vertical direction after the reflection, and reflected again at the reflective layer arranged at the first inclined plane. Most of the light rays will exit at the four planes of 1b, 1c, 1d, 1e, and reach the outside after being scattered, wherein the exit position thereof is further away from the light source and the oblique angle of emission is even larger. Hence, to the human eyes, it is namely the light emitted from the outer edge of the light tube 102 that surrounds the light source 101 or from light emitting area close to the surrounding display screen S2 in the area where the display screen frame S1 locates, and the luminance is relatively large when being viewed obliquely.

Most of the light rays with a further larger absolute value of emission angle (according to an example, the emission angle can be about less than −60 degree or greater than 60 degree) will exit from planes 1a and 1b, and reach the outside after being scattered, which can also form a luminous effect of the edge area of the light tube, and the luminance is relatively large when being viewed obliquely With combination of the above light rays display effect, the human eyes can observe that light rays exit at various positions (1a, 1b, 1c, 1d, 1e) of the upper surface 1021 of the light tube 102, and light can be received from all observation angles, hence, to the human eyes, it will be the display effect that light is emitted from the area where the whole display screen frame S1 locates. In cooperation with the display input provided by the drive module to the light source 101, the whole light tube 102 seems to display the edge pixels of the display area in the display screen, thus the human eyes can see the frame eliminating effect at every angle.

As for the display screen frame eliminating apparatus applied in a single frame display screen as shown in FIG. 1(b), its upper surface further comprises a fourth vertical plane 1f, and the fourth vertical plane can be at least partly formed by a transflective layer. The light path in the light tube in this structure keeps consistent with the above double frame apparatus, and the difference only lies in that the light rays that reaches the 1f plane will be partially transmitted to the outside, and partially reflected back into the light tube, which is favorable for improving the visual effect of the frame elimination. Certainly, such an edge processing manner of arranging a vertical plane directly is just an example, various design manners of the light tube edge such as round corner, trapezoid, "⌐" shape etc., can also be used in different application scenario.

Figure 4:
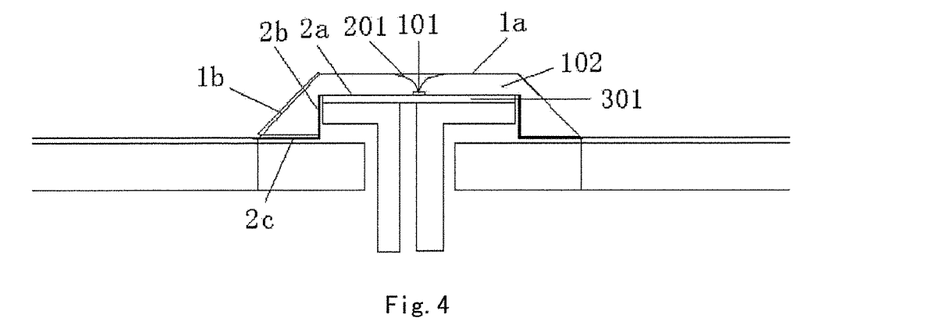
FIG. 4 is a schematic structure diagram of a display screen frame eliminating apparatus with a trapezoid light tube in an embodiment of the present invention.

Certainly, the shapes of the upper surface 1021 and the lower surface 1022 of the light tube 102 are not limited to the above shapes, and examples of several other shapes are given below:

Referring to FIG. 4, the lower surface 1022 of the light tube 102 can comprise a first horizontal plane 2a, a first vertical plane 2b and a second horizontal plane 2c connected successively from top to bottom. A reflective layer can be formed on the second horizontal plane 2c. The upper surface 1021 of the light tube 102 can comprise a third horizontal plane 1a and a first inclined plane 1b connected successively from top to bottom. The first inclined plane 1b can be at least partly formed by a transflective layer. Such a trapezoid light tube structure can also comprise a transflective film 201. The overall light path and dispersed exit principle of the trapezoid light tube structure are similar as the above "⌐-shaped" light tube structure. Comparatively, such a trapezoid light tube structure can simplify the fabricating process of the light tube and enhance the visual effect.

Figure 5:
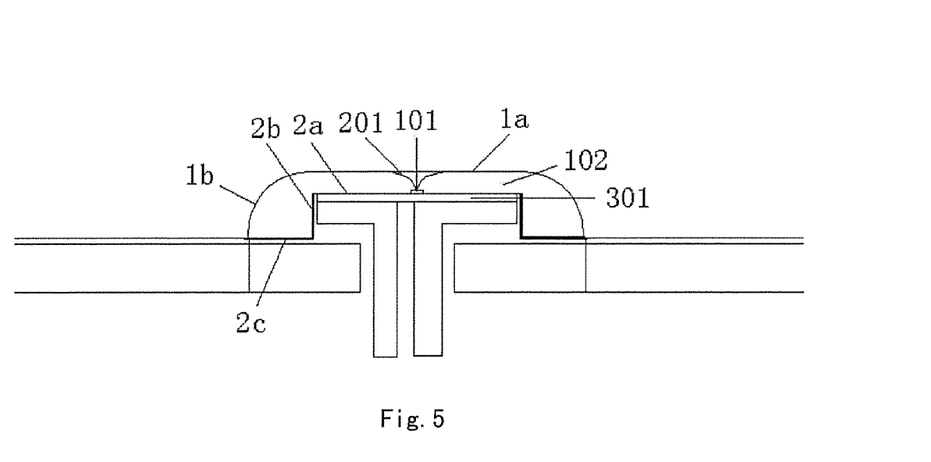
FIG. 5 is a schematic structure diagram of a display screen frame eliminating apparatus with a round-corner light tube in an embodiment of the present invention.

Referring to FIG. 5, the lower surface 1022 of the light tube 102 can comprise a first horizontal plane 2a, a first vertical plane 2b and a second horizontal plane 2c connected successively from top to bottom. A reflective layer can be formed on the second horizontal plane 2c. The upper surface 1021 of the light tube 102 can comprise a third horizontal plane 1a and a first cambered surface 1b connected successively from top to bottom. The first cambered surface 1b can be at least partly formed by a transflective layer. Similarly such a light tube with a round corner structure can also comprise a transflective film 201, and the corresponding dispersed exit light path also has a form similar as the light path as shown in FIG. 3. Such a structure can also simplify the fabricated structure of the light tube and enhance the visual effect.

Figure 6:
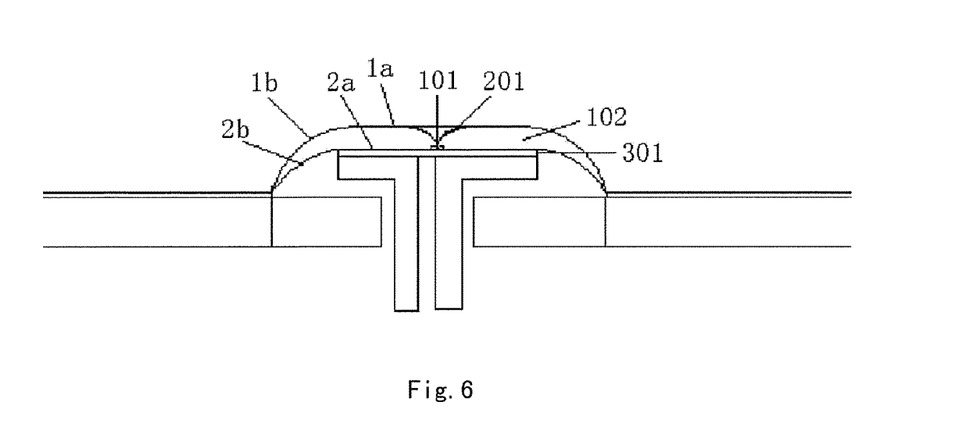
FIG. 6 is a schematic structure diagram of a display screen frame eliminating apparatus with a sharp-corner light tube in an embodiment of the present invention.

Referring to FIG. 6, the lower surface 1022 of the light tube 102 can comprise a first horizontal plane 2a and a first cambered surface 2b connected successively from top to bottom. The upper surface 1021 of the light tube 102 can comprise a second horizontal plane 1a and a second cambered surface 1b connected successively from top to bottom. Such a sharp-corner light tube structure that only comprises a transflective film 201 but does not comprise a reflective layer or a tranflective layer can enhance the visual effect and save light energy, meanwhile, it does not need to fabricate extra transflective layer and reflective layer, hence, the cost and fabrication difficulty can be reduced.

Figure 7:
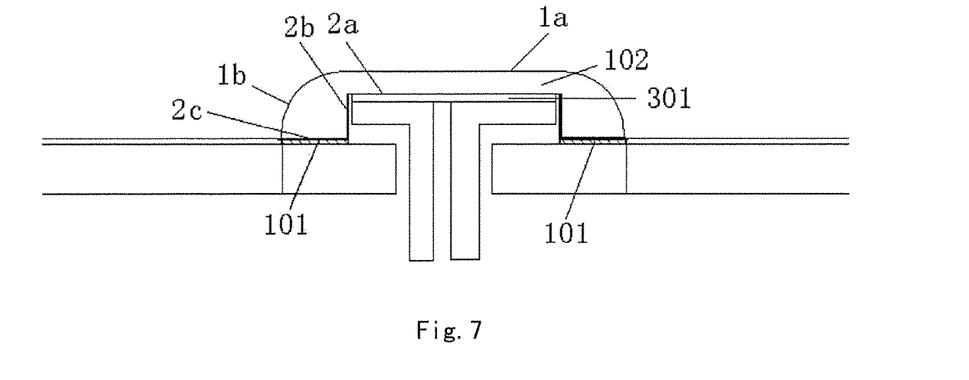
FIG. 7 is a schematic structure diagram of a display screen frame eliminating apparatus with a double side light source type round-corner light tube in an embodiment of the present invention.

Referring to FIG. 7, the lower surface 1022 of the light tube 102 can comprise a first horizontal plane 2a, a first vertical plane 2b and a second horizontal plane 2c connected successively from top to bottom. A reflective layer can be formed on the second horizontal plane 2c. The upper surface 1021 of the light tube 102 can comprise a third horizontal plane 1a and a first cambered surface 1b connected successively from top to bottom. The first cambered surface 1b can be at least partly formed by a transflective layer. The light source 101 can be located at the position of the second horizontal plane 2c of the light tube 102, can be located at other positions within the light tube 102 or can be located at the outside of the light tube 102. In such a round-corner structure light tube, the light source 101 is moved from the middle of the frame to the side of the frame, thus a double-sided light source structure is fabricated, which can also enhance the visual effect and save the light energy. Meanwhile, since it does not need to fabricate extra transflective film, transflective layer and reflective layer, the cost and fabrication difficulty can be reduced.

In an embodiment, the light tube 102 of any of the above display screen frame eliminating apparatus can be fixed on the display screen frame S1 through a thermal conductive adhesive layer 301 (as shown in FIG. 4 to FIG. 7) located between the first horizontal plane 2a and the display screen frame S1. Such a fixation manner is not only convenient but also favorable for heat dissipation of the light source, and has strong practicality.

In an embodiment, the light source can comprise at least one light emitting diode (LED) or at least one organic light emitting diode (OLED). That is to say, the LED or OLED in the LED or OLED pixel array structure as shown in FIG. 2 is used as the light source of the display screen frame eliminating apparatus. For most existing display devices, the luminous manner of such a light source is same or similar as that of the display screen, which can achieve a better frame eliminating effect; moreover, the array driving manner and structure thereof are also same or similar as that of the pixel array, which facilitates the integration with the corresponding display screen fabrication process.

Figure 8:
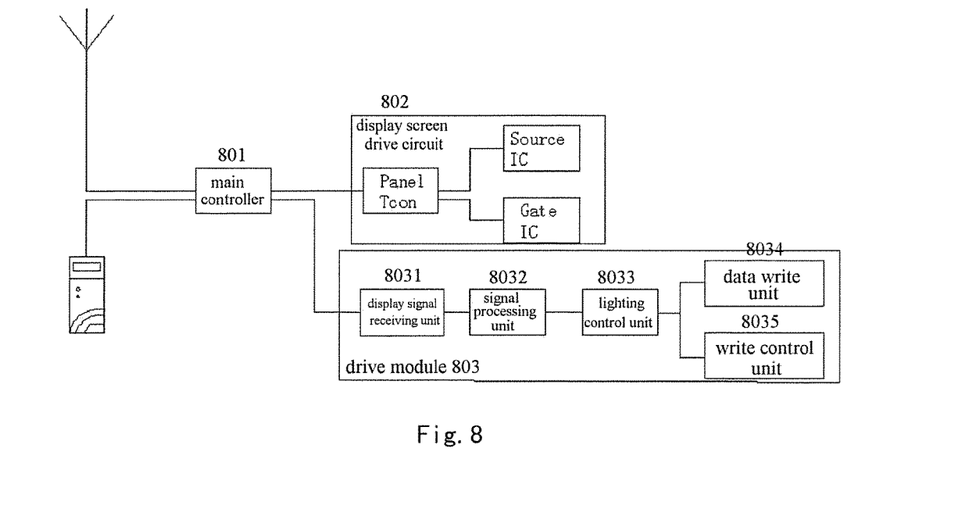
FIG. 8 is a schematic structure diagram of a drive module corresponding to an LED or OLED pixel array in an embodiment of the present invention.
Figure 9:
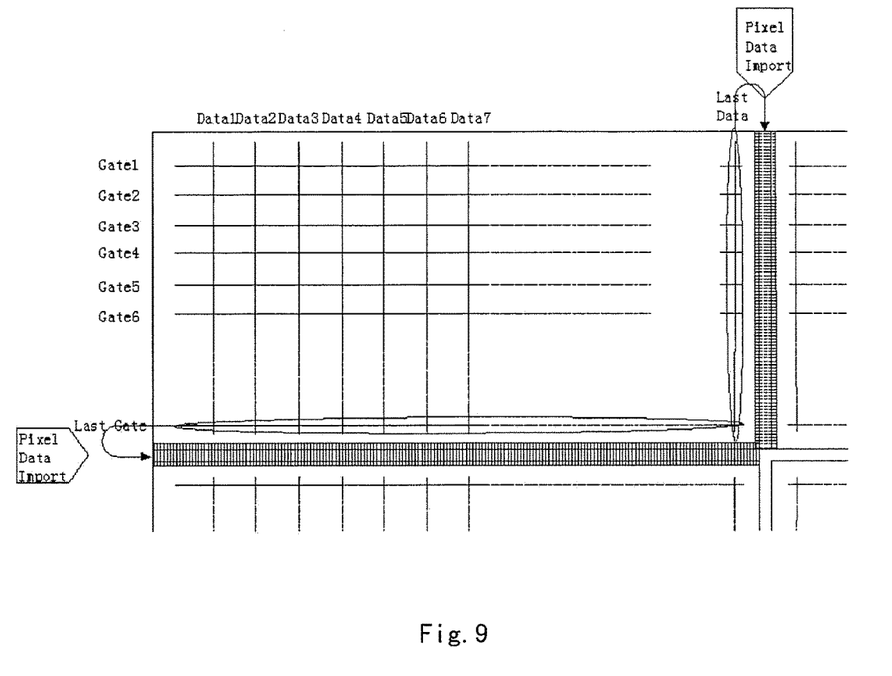
FIG. 9 is a schematic diagram illustrating a position and signal relationship of an LED or OLED pixel array relative to the display panel in an embodiment of the present invention.
Figure 10:
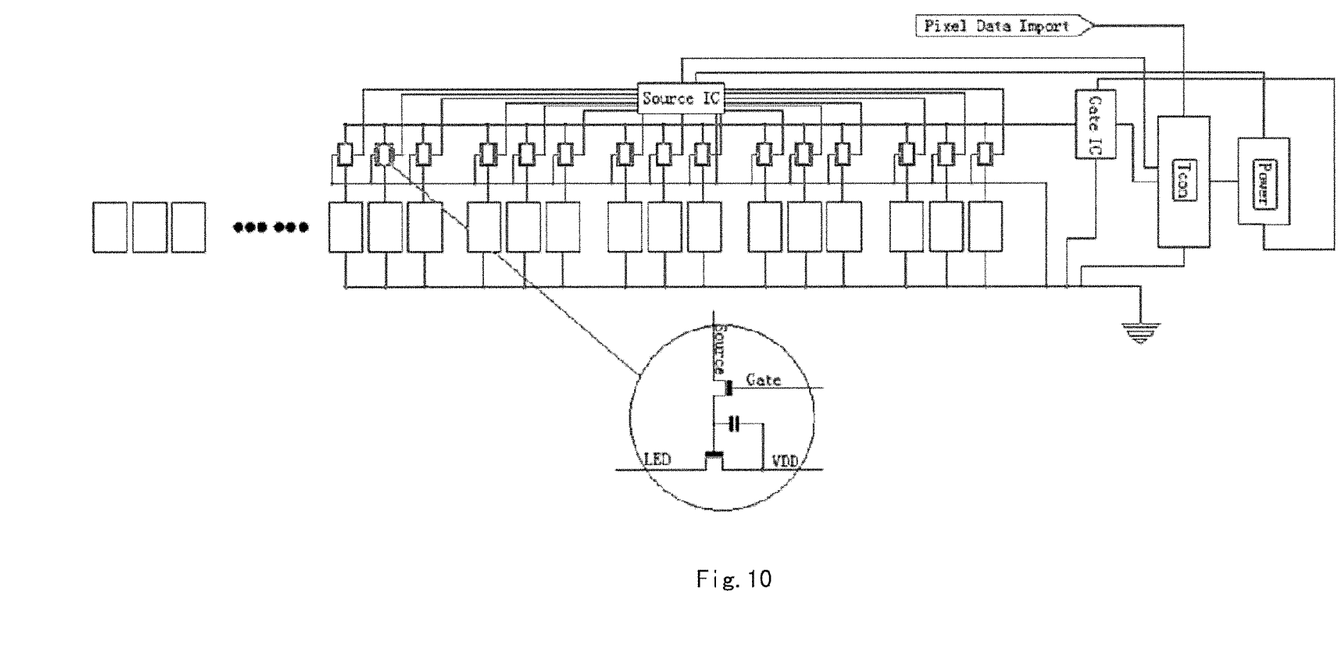
FIG. 10 is a structural diagram of an overall drive circuit for an LED or OLED pixel array in an embodiment of the present invention.

In order to explain the technical solutions of some embodiments described herein more clearly, the structures of a corresponding drive module and a drive circuit employed when using the above LED or OLED will be exhibited next with reference to FIGS. 8-10.

Referring to FIG. 8, the drive module 803 comprises a display signal receiving unit 8031, a signal processing unit 8032, a lighting control unit 8033, a data write unit 8034 and a write control unit 8035. The display signal receiving unit 8031 can be configured to receive and store a display signal of the display screen and to send the display signal to the signal processing unit 8032. The signal processing unit 8032 can be configured to extract edge pixel data of the display area in the display screen from the received display signal, and to transmit it to the lighting control unit 8033. The lighting control unit 8033 can be configured to generate a data write signal and a write control signal for controlling the luminous condition of the light source based on the received edge pixel data of the display area, and to transmit them to the data write unit 8034 and the write control unit 8035 respectively. The data write unit 8034 and the write control unit 8035 can be configured to enable, under the control of the write control signal, each of the light emitting elements in the light source to emit light successively under the control of the data write signal.

That is to say, when a main controller 801 sends a display signal to a display screen drive circuit 802, the display signal receiving unit 8031 also receives and store the display signal of the display screen, after the signal processing unit 8032 extracts the edge pixel data (e.g., a voltage or current signal for controlling each edge pixel to emit light), the lighting control unit 8033 converts it into a write control signal and a data write signal (e.g., a gray write voltage) for the LED or OLED pixel array, so as to drive the light source in the display screen frame eliminating apparatus. Certainly, at the same moment, each pixel element in the display screen will also display images under the driving of the display screen drive circuit 802 (which can comprise a timing controller Panel Tcon, a source driver Source IC and a gate driver Gate IC).

According to an example, the position of the LED or OLED pixel array relative to the display screen is as shown in FIG. 9. As shown in the figure, what needs to be extracted by the drive module is namely the Data (i.e., the display signal including the edge pixel data) in the last row (i.e., Last Gate in FIG. 9) and the last column (i.e., Last Data in FIG. 9) in the display screen, i.e., it needs to transfer the edge pixel data (i.e., Pixel Data import in FIG. 9) to the display signal receiving unit 8031 of the drive module 803, for acquiring the luminous condition of the edge pixels so as to control each LED or OLED to emit light.

Because the LED or OLED pixel array has the same driving manner as that of the pixel array in the display screen, it can have a similar circuit structure as that of the display screen drive circuit. For example, the timing controller Tcon can serve as the lighting control unit, the source driver Source IC can serve as the data write unit, the gate driver Gate IC can serve as the write control unit, which are powered by the voltage source Power, and these constitute the LED or OLED pixel array drive structure as shown in FIG. 10.

Each LED or OLED can comprise a corresponding drive circuit, and each of the drive circuits can comprise a light emitting element LED or OLED, a first switch element, a second switch element and a capacitance.

A control end of the first switch element can be connected with the write control unit, a first end of the first switch element can be connected with the data write unit. A second end of the first switch element can be connected with a control end of the second switch element and a second end of the capacitance. An input end of the light emitting element can be connected with a second end of the second switch element, the light emitting element can be configured to emit light based on the voltage inputted by the input end as shown. A first end of the capacitance and a first end of the second switch element can be coupled to a high level work voltage. In an embodiment, the first switch element and the second switch element can be thin film transistors.

The above circuit structure is namely the circuit structure amplified in the circle in FIG. 10, wherein Source represents connection with the source driver Source IC, Gate represents connection with the gate driver Gate IC, LED represents connection with the light emitting element LED or OLED, and VDD represents the high level work voltage.

Therefore, such a 2T1C drive circuit can be used to drive the corresponding LED or OLED to emit light, wherein the gray voltage written by it originates from the display data of the edge pixels sent by the above display signal receiving unit and the signal processing unit.

The above drive module is mainly directed at the situation where the LED or OLED serves as the light emitting element of the light source, which can accomplish driving of the corresponding light emitting element and participate in implementation of the frame eliminating function of the display screen frame eliminating apparatus. The fabrication process of the drive module is simple and easy for implementation, and especially suitable for frame elimination of the spliced Liquid Crystal Display screens.

According to an embodiment of the present invention, a display device is further proposed, which comprises a display screen frame eliminating apparatus according to any of the embodiments described above. The display device can be any product or component with display function such as a liquid crystal panel, a mobile phone, a tablet computer, a TV set, a display, a notebook computer, a digital photo frame, a navigator and so on.

In an embodiment, the display device can comprise at least two display panels spliced together, the display screen frame eliminating apparatus is located on the frame at a splicing seam between the display panels. That is to say, in this embodiment, at the position of the splicing seam between the mutually spliced display panels, the double frame display screen frame eliminating apparatus stated in the above embodiment is mounted, the mounting, setting and implementation thereof are also same as the above embodiments, so as to achieve the display effect of eliminating the splicing seam.

Since the display device comprises the display screen frame eliminating apparatus stated above, it comprises the same technical features as those of the display screen frame eliminating apparatus, therefore, it can also solve the same technical problem and achieve the same technical effect.

To sum up, some embodiments described herein provide a display screen frame eliminating apparatus, which uses an internal light source, under the control of a drive module, to emit light rays similar as those of the edge pixels of the display area in the display screen. By means of a layered light tube structure with an upper surface and a lower surface, it is realized that the light rays dispersedly exit from the upper surface of the light tube. Therefore to the human eyes, the display influence of the frame can be eliminated in every direction, and the display effect of the display device can be improved.

It needs to be noted that the relational terms such as first and second and so on herein are only used for distinguishing one entity or operation from another, while not requiring or implying any actual relations or orders among these entities or operations. Moreover, the terms of "include", "comprise" or any other variants intend to cover non-exclusive inclusion, such that the process, method, article or device including a series of elements not only includes those listed elements but also includes other element not listed explicitly, or can further includes inherent elements of such process, method, article or device. In the case of without further limitations, the element defined by phrase of "including a . . ." does not exclude that there are other same elements in the process, method, article or device that includes the element. Just as used herein, the indefinite article "a" or "an" before any element does not exclude the presence of a plurality of such elements.

The above embodiments are only used for explaining some implementations of the present invention, rather than limitations to the present invention. Although some embodiments of the present invention have been explained in detail with reference to the preceding examples, the ordinary skilled person in the art should understand that modifications still can be made to the technical solutions stated in the preceding embodiments, or alternative replacements can be made to some of the technical features therein; and these modifications or replacements do not make the essence of the corresponding technical solutions depart from the spirit and scope of the technical solutions of the embodiments of the present invention.

The invention claimed is:

1. A display screen frame eliminating apparatus comprising a light source, a light tube and a drive module, the display screen frame eliminating apparatus is independent of the display screen, wherein:
    the light tube comprises an upper surface and a lower surface, and the light source is located within the light tube or under the lower surface of the light tube, wherein the light tube comprises at least one transflective film, the surface of which is a curved surface, connected between the upper surface and the lower surface of the light tube;
    the upper surface and the lower surface of the light tube both cover the display screen frame and a non-display edge area of the display screen, the light tube is configured to enable light emitted by the light source to dispersedly exit from the upper surface of the light tube;
    the drive module is configured to acquire a luminous condition of edge pixels of a display area in the display screen and drive the light source to emit light based on the acquired luminous condition;
    the light source is located above the display screen frame, from the view of the normal longitudinal sections of the display screen and the display screen frame, the transflective film appears as an upwardly convex curve above the light source; and
    light emitted by the light source which is partially reflected by the transflective film is propagated along a direction parallel to the display screen surface.

2. The display screen frame eliminating apparatus according to claim 1, wherein the lower surface of the light tube comprises a first horizontal plane, a first vertical plane, a first inclined plane and a second horizontal plane connected successively;
    a reflective layer formed on the first inclined plane;
    the upper surface of the light tube comprises a third horizontal plane, a second inclined plane, a second vertical plane, a fourth horizontal plane and a third vertical plane connected successively;
    the second inclined plane is at least partly formed by a transflective layer.

3. The display screen frame eliminating apparatus according to claim 1, wherein the lower surface of the light tube comprises a first horizontal plane, a first vertical plane and a second horizontal plane connected successively;
    a reflective layer formed on the second horizontal plane;
    the upper surface of the light tube comprises a third horizontal plane and a first inclined plane connected successively;
    the first inclined plane is at least partly formed by a transflective layer.

4. The display screen frame eliminating apparatus according to claim 2, wherein the light tube is fixed on the display screen frame through a thermal conductive adhesive layer located between the first horizontal plane and the display screen frame.

5. The display screen frame eliminating apparatus according to claim 3, wherein the light tube is fixed on the display screen frame through a thermal conductive adhesive layer located between the first horizontal plane and the display screen frame.

6. The display screen frame eliminating apparatus according to claim 1, wherein the lower surface of the light tube comprises a first horizontal plane, a first vertical plane and a second horizontal plane connected successively;

a reflective layer formed on the second horizontal plane;
the upper surface of the light tube comprises a third horizontal plane and a first cambered surface connected successively;
the first cambered surface is at least partly formed by a transflective layer.

7. The display screen frame eliminating apparatus according to claim 6, wherein the light tube is fixed on the display screen frame through a thermal conductive adhesive layer located between the first horizontal plane and the display screen frame.

8. The display screen frame eliminating apparatus according to claim 1, wherein the lower surface of the light tube comprises a first horizontal plane and a first cambered surface connected successively; the upper surface of the light tube comprises a second horizontal plane and a second cambered surface connected successively.

9. The display screen frame eliminating apparatus according to claim 8, wherein the light tube is fixed on the display screen frame through a thermal conductive adhesive layer located between the first horizontal plane and the display screen frame.

10. The display screen frame eliminating apparatus according to claim 1, wherein the light source comprises at least one light emitting diode or at least one organic light emitting diode.

11. The display screen frame eliminating apparatus according to claim 1, wherein the drive module comprises a display signal receiving unit, a signal processing unit, a lighting control unit, a data write unit and a write control unit,
the display signal receiving unit is configured to receive and store a display signal of the display screen, and to send the display signal to the signal processing unit;
the signal processing unit is configured to extract edge pixel data of a display area from the display signal and to transmit the edge pixel data to the lighting control unit;
the lighting control unit is configured to generate a data write signal and a write control signal for controlling the light source to emit light based on the edge pixel data received from the signal processing unit, and to transmit the data write signal and the write control signal to the data write unit and the write control unit respectively;
the data write unit and the write control unit are configured to enable, under the control of the write control signal, the light source to emit light.

12. The display screen frame eliminating apparatus according to claim 11, wherein the light source comprises at least one drive circuit, each of which comprises a light emitting element, a first switch element, a second switch element and a capacitance, wherein,
a control end of the first switch element is connected with the write control unit, a first end of the first switch element is connected with the lighting control unit;
a second end of the first switch element is connected with a control end of the second switch element and a second end of the capacitance;
an input end of the light emitting element is connected with a second end of the second switch element, the light emitting element emits light based on a voltage inputted by the input end;
a first end of the capacitance and a first end of the second switch element are coupled to a high level work voltage.

13. The display screen frame eliminating apparatus according to claim 12, wherein the first switch element and the second switch element are thin film transistors.

14. The display screen frame eliminating apparatus according to claim 13, wherein the signal processing unit is a timing controller, the lighting control unit is a source driver and the write control unit is a gate driver.

15. A display screen frame eliminating apparatus comprising a light source, a light tube and a drive module, the display screen frame eliminating apparatus is independent of the display screen, wherein:
the light tube comprises an upper surface and a lower surface, and the light source is located within the light tube or under the lower surface of the light tube;
the upper surface and the lower surface of the light tube both cover the display screen frame and a non-display edge area of the display screen, the light tube is configured to enable light emitted by the light source to dispersedly exit from the upper surface of the light tube;
the drive module is configured to acquire a luminous condition of edge pixels of a display area in the display screen and drive the light source to emit light based on the acquired luminous condition,
the lower surface of the light tube comprises a first horizontal plane, a first vertical plane and a second horizontal plane connected successively;
a reflective layer formed on the second horizontal plane;
the upper surface of the light tube comprises a third horizontal plane and a first cambered surface connected successively;
the first cambered surface is at least partly formed by a transflective layer; and
the light source is located within the light tube or on the second horizontal plane of the lower surface of the light tube.

16. The display screen frame eliminating apparatus according to claim 15, wherein the light tube is fixed on the display screen frame through a thermal conductive adhesive layer located between the first horizontal plane and the display screen frame.

17. A display device comprising a display screen frame eliminating apparatus which comprises a light source, a light tube and a drive module, the display screen frame eliminating apparatus is independent of the display screen, wherein:
the light tube comprises an upper surface and a lower surface, and the light source is located within the light tube or under the lower surface of the light tube;
the upper surface and the lower surface of the light tube both cover the display screen frame and the non-display edge area of the display screen, the light tube is configured to enable light emitted by the light source to dispersedly exit from the upper surface of the light tube;
the drive module is configured to acquire a luminous condition of edge pixels of a display area in the display screen and drive the light source to emit light based on the acquired luminous condition;
the light tube comprises at least on transflective film, the surface of which is a curved surface, connected between the upper surface and the lower surface of the light tube;
the light source is located above the display screen frame, from the view of the normal longitudinal sections of the display screen and the display screen frame, the transflective film a pears as an upwardly convex curve above the light source; and light emitted by the light source which is partially reflected by the transflective film is propagated along a direction parallel to the display screen surface.

18. The display device according to claim 17, wherein the display device comprises at least two display panels spliced together, and the display screen frame eliminating apparatus is located on the display screen frame at the splicing seam between the two display panels.

19. A display device comprising a display screen frame eliminating apparatus which comprises a light source, a light tube and a drive module, the display screen frame eliminating apparatus is independent of the display screen, wherein, the light tube comprises an upper surface and a lower surface, and the light source is located within the light tube or under the lower surface of the light tube;

the upper surface and the lower surface of the light tube both cover the display screen frame and the non-display edge area of the display screen, the light tube is configured to enable light emitted by the light source to dispersedly exit from the upper surface of the light tube;

the drive module is configured to acquire a luminous condition of edge pixels of a display area in the display screen and drive the light source to emit light based on the acquired luminous condition, wherein the lower surface of the light tube comprises a first horizontal plane, a first vertical plane and a second horizontal plane connected successively;

a reflective layer formed on the second horizontal plane;

the upper surface of the light tube comprises a third horizontal plane and a first cambered surface connected successively;

the first cambered surface is at least partly formed by a transflective layer;

the light source is located within the light tube or on the second horizontal plane of the lower surface of the light tube.

* * * * *